June 14, 1966  H. J. TIERNEY  3,255,875
COMPOSITE REINFORCED RESIN SHEET
Filed July 5, 1963
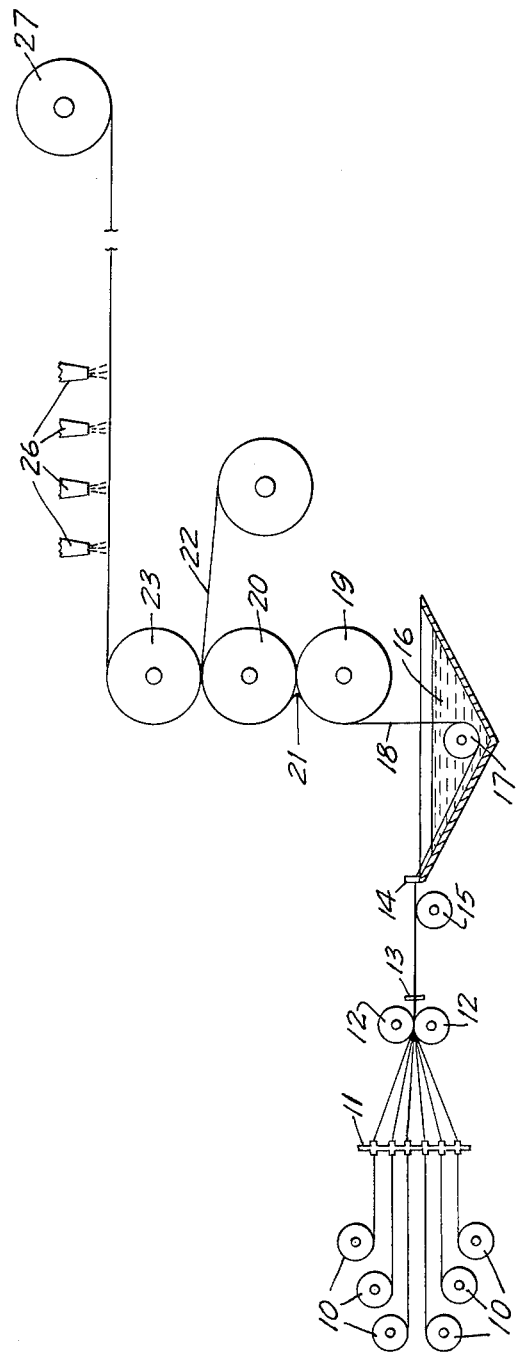
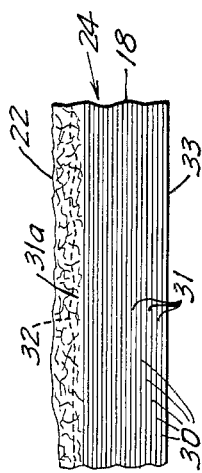
INVENTOR.
HUBERT J. TIERNEY
BY
Carpenter Abbott Coulter & Kinney
ATTORNEYS

United States Patent Office 3,255,875
Patented June 14, 1966

3,255,875
COMPOSITE REINFORCED RESIN SHEET
Hubert J. Tierney, Dellwood, Minn., assignor to Minnesota Mining and Manufacturing Company, St. Paul, Minn., a corporation of Delaware
Filed July 5, 1963, Ser. No. 293,587
8 Claims. (Cl. 206—59)

This invention relates to a thin, flexible, self-sustaining resinous sheet which is characterized by the capability of being wound directly upon itself into roll form for storage and transportation and later unwound and converted under heat and pressure into structural members of equivalent or higher strength than any other reinforced resin structures on the market.

The highest strength reinforced resin structural members are made with sheets of lineally-aligned, contiguous, continuous glass filaments impregnated with thermosetting resin, particularly epoxy resin. Such reinforced resin sheets have heretofore been marketed with a disposable low-adhesion liner to permit the sheet to be wound up into a roll from which it could be later unwound, cut to useful lengths, separated from the liner and laid up in stacked segments in the manufacture of laminated structures. These structures have extraordinary strength and durability, far superior to laminates made with woven glass fabric. To assure this superiority, it is important that the filaments remain in true alignment, but there has been a tendency for the filaments or bundles of filaments to develop kinks or bird's-eyes. In some cases this appears to have resulted from expansion and contraction of the disposable liner with varying conditions of temperature and humidity. It is believed that stresses introduced into the liner on manufacture of the sheet may sometimes have caused or contributed to the bird's-eye formation. It is also suspected that partial curing of the resin during storage of the sheet in roll form causes stresses which may be relieved by the formation of bird's-eyes. Whatever the cause, the presence of bird's-eyes certainly inhibits the realization of optimum physical properties in cured products of the otherwise lineally-reinforced resinous sheet.

The low-adhesion liner has also been the source of another problem where the liner overlaps the edges of the resinous sheet. In such cases, the liner obstructs the view of the edges and makes difficult the exact placement of the sheet. This problem is especially acute where wide sheets are being laid up side-by-side with abutting edges.

The present invention concerns a composite sheet which, like the sheet material discussed above, essentially consists of a flat integral layer of uniformly-distributed, nonwoven, lineally-aligned, essentially contiguous continuous high-strength filaments saturated with thermosetting resin. In addition, the novel sheet incorporates means for holding the filaments in virtually perfect lineal alignment, even under adverse conditions of storage. As compared to the previously known lineally-reinforced resinous sheet which has been carefully managed to avoid bird's eyes, the novel composite sheet provides cured laminates of equal quality in all major respects. Because the composite sheet can be wound convolutely upon itself in roll form, the use of a disposable liner is unnecessary so that the ultimate user is not put to the trouble and expense of its disposal. There is sufficient clinging to hold the sheet together in the wound roll. After storing for several months, even under relatively adverse conditions, the linerless sheet remains singularly free from bird's-eyes and can be readily unwound and used in making up laminated structural members of equivalent quality to structures prepared with freshly made sheet material of the prior art.

These advantages are imparted by employing with the resin-impregnated layer of lineally-aligned filaments an ultra-thin nonwoven compacted tissue overlay which is at most only partially impregnated with resin. The tissue overlay comprises randomly interlaced smooth staple fibers such as are obtained by extruding man-made polymers, especially polymers of very high molecular weight (so-called "super-polymers") obtained from bifunctional condensations such as esterification, amidification, etherification, anhydride formation or acetal formation. Also useful are staple fibers of polypropylene and polyvinyl chloride. Lightweight textryl based on oriented polyethylene terephthalate fibers or based on oriented nylon fibers have special utility, especially if first hot-calendered into a paper-like sheet.

I am aware that for many years nonwoven mats of fibers such as polyethylene terephthalate have been used as surface layers for lineally-reinforced resinous sheets, but these have been relatively thick fluffy mats and almost always saturated with resin. In fact, their major use has been to permit a higher proportion of resin than could effectively be retained by exclusively lineally-aligned filaments. In no case has it been suggested that such a resinous sheet could be wound convolutely upon itself and later unwound, nor would it have been possible to do so in a utilitarian manner with any such sheet. The composite sheet of the present invention is the only sheet material that I have ever seen which consists basically of lineally-aligned filaments or fibers impregnated with all the resin needed to attain dense, homogeneous cured products and yet can be convolutely wound directly upon itself in a roll and later unwound and used to make strong structural members.

In order to eliminate the need for a low-adhesion liner, the tissue overlay should have a basis weight of about 0.2 to one ounce per square yard, preferably less than 0.5. Its caliper thickness should be about 0.5 to 5 mils, more preferably 1–3 mils. The overlay is much easier to handle in fabricating the composite sheet if compacted (as by hot calendering) to a caliper thickness in mils within about 2–8 times the basis weight in ounces per square yard. Within this ratio the overlay is readily impregnated to a desirable extent in the manufacture of the resinous sheet and becomes fully impregnated at temperatures and pressures normally used in the curing operation. At substantially above 8 times in this ratio, there may be a tendency for the composite sheet to delaminate upon unwinding from the linerless roll. At thicknesses substantially greater than 5 mils and basis weights substantially in excess of one ounce per square yard, the overlay provides an undesirably high proportion of the total composite sheet with consequent reduction in strength per unit cross-sectional area of cured product. Furthermore, surface layers of lighter thinner tissue function very adequately, both in eliminating the need for a disposable liner and in restraining against bird's-eye formation, and have the advantage of being quite inconspicuous. Added weight would merely waste raw material.

For most uses, the total caliper thickness of composite sheet of this invention should approximate 10–15 mils or less since sheets of much thicker caliper, e.g., more than 20 mils, lack flexibility and conformability and tend to impede the freedom of the designer in orienting the lineally-aligned filaments in multiple layers to best advantage. Because the tissue overlay contributes considerable crosswise strength, the overall thickness can be very thin, e.g., as thin as 3 or 4 mils, in which case the overlay by itself should be less than 1.5 mils in thickness so that the lineally-reinforced layer is the predominate portion of the composite sheet.

Preferably the staple fibers of the tissue overlay are of a single length within the approximate range of 0.25 to 1.5 inches. Below this range the tissue may be somewhat hard to handle in application to the lineally-reinforced layer. On the other hand, tissue made with staple fibers of substantially greater length than 1.5 inches has a tendency to be somewhat less uniform than is desirable.

As the lineally-aligned filaments, glass is especially preferred because of its chemical inertness and great strength and resistance to flexural fatigue when the resin saturant is cured. A range of about 0.00015–0.0006 inch diameter is desirable for glass filaments. The glass should have a resin-receptive surface treatment such as a priming treatment of a silane or an organo-metallic complex, or the treatment may simply consist of heating the glass filaments just prior to saturation with the resin binder composition. In place of or in addition to glass may be used high-strength polymeric filaments such as oriented polyethylene terephthalate, nylon, rayon, or oriented cellulose obtained by saponification of oriented cellulose acetate ("Fortisan").

Because of the widely varying specific gravities of the filament reinforcement, the proportion of filaments to resin is best considered by way of volume. A practical range of aligned filaments to total resin in the novel composite sheet extends from about 65:35 to 35:65 by volume. Above about 65% aligned filaments, the resin might not fully saturate the tissue overlay when the composite sheet is cured. Above about 65% resin, the exposed surface of the lineally-reinforced layer may be too resin-rich and tacky to permit easy unwinding from roll form.

Reference is now made to the drawing wherein:

FIG. 1 illustrates a preferred method of making the novel composite sheet; and

FIG. 2 schematically illustrates by a greatly enlarged side elevation the composite sheet product of FIG. 1.

In FIG. 1, a supply of high-strength filaments such as glass is made available by a bank of spools 10. Each of the spools contains a number of bundles or ends which may be drawn in a wide web in essentially contiguous, lineally-aligned relationship through an eyelet board 11, past a pair of spaced rollers 12 and through a comb 13. The latter, together with a comb 14, serves to space the ends at a uniform density, e.g., 200 ends per inch. This web is drawn across an idler roll 15, into a bath of resin 16, and around a cylindrical roll 17, which is adjusted to carry the web close to the bottom of the bath. Suitable means (not shown) are provided for supplying resin and heating to maintain it at a suitable viscosity within a preferred range of 2–40 poises. The positioning of the roll 17 insures that the contents of the bath 16 remain fresh.

The resin-coated web 18 drawn from the bath 16 is passed between two driven heated calender rolls 19, 20 which serve to densify and flaten the web and to remove excess resin, which forms a bead 21 at the nip. The rolls 19, 20 are adjustably spaced to limit the resin matrix of the web 18 to a desired proportion. The web 18 then contacts a continuous nonwoven tissue 22 of randomly interlaced extruded staple fibers as it is drawn around a driven cylindrical roll 23 which is spaced from the calender roll 20 by a distance sufficient to cause the matrix resin of the web 18 to partially impregnate the tissue 22. The resultant composite sheet 24 is then passed beneath air jets 26 which assist in cooling the resin matrix to a viscosity in the range of 1–35 million poises. The cooled product is wound up into roll form at a windup drum 27.

The composite sheet 24 produced as indicated in FIG. 1 is schematically illustrated in FIG. 2 in side elevation, greatly enlarged. The major proportion of the sheet consists of the resin-filled web 18 made up of a very large number of essentially contiguous, lineally-aligned individual filaments 30 saturated with and held together by a thermosetting resin matrix binder composition 31 within a glass-resin volume ratio of about 65:35 to 35:65. This lineally-reinforced layer may have a uniform caliber thickness of about 10 mils. The surface layer of the composite sheet 24 consists of the nonwoven tissue 22 of interlaced polymeric fibers which is partially impregnated by the resin matrix, as indicated at 31a, extending to an "imaginary" boundary 32 above which the sheet is essentially resin-free.

When the composite sheet 24 is convolutely wound directly upon itself into a linerless roll, as indicated at windup drum 27 in FIG. 1, the slightly tacky exposed surface 33 of the lineally-reinforced resin-coated layer 18 contacts the nonwoven tissue 22 of the underlying convolution to provide sufficient clinging to hold the tape together in the wound roll. However, adjacent convolutions readily separate between these surfaces upon unwinding without undue fiber-picking, and the composite sheet 24 may then be cut into segments, laid up and converted under heat and pressure to provide high-strength laminated structures. The heat and pressure upon curing causes the resin matrix 31, 31a to flow into the unimpregnated portion of the non-woven tissue 22 to provide homogeneous cured products which are essentially free from voids. In fact, it is believed that the unimpregnated portion of the tissue 22 assists in bleeding off air which otherwise might be trapped between adjacent layers, especially in the manufacture of laminated structures of very large area.

Specific forms of the invention are illustrated by the following examples without intent to be limited thereto.

*Example 1*

The lineally-reinforced portion of a composite sheet of this invention was prepared using spools of continuous glass filament rovings, specifically ECG 140's, vinyl silane size. These were drawn in a wide flat layer at a density of 200 ends per inch through a bath of an epoxy resin condensation product of epichlorohydrin and bisphenol A, having a softening point of about 45° C. as determined by the Durrans' mercury method, in admixture with a hardener consisting essentially of isophthalyl dihydrazine. By immersion in the bath of resin, which was maintained at 95° C. (at which temperature its viscosity was about 10–15 poises), the rovings became a continuous resin-coated web which was passed between heated calender rolls and then continuously joined to polyester textryl tissue. The surface temperatures of the rolls were maintained at about 95° C., with the spacing between the calender rolls adjusted to provide a resin content of approximately 36% by weight (about 54% by volume), and the spacing of the laminating roll adjusted so that the textryl tissue overlay was partially impregnated with resin. The textryl tissue consisted of randomly-interlaced oriented polyethylene terephthalate fibers of about 1.5 denier and 0.25-inch length and polyester fibrids of similar chemical composition, the weight ratio of fibers to fibrids being about 3:1. The tissue had been calendered to a thickness of about 1.7 mils. Its basis weight was about 0.35-ounce per square yard. After the composite sheet was cooled to about room temperature, it was convolutely wound directly upon itself into a roll for storage and handling.

Fourteen layers of this composite sheet were laid up in a press is crossply fashion, viz., with the direction of filaments in each layer offset 90° from those of adjacent layers. After about 2 minutes under contact pressure at 160° C., the pressure was raised to 25–50 pounds per square inch, and both pressure and temperature were maintained for 30 minutes. The laminated panel had a thickness of 0.126-inch, a specific gravity of 1.87, and an organic content (resin plus polyester tissue) of 31.2% by weight (about 49% by volume).

Test specimens cut from this panel, with their lengthwise direction parallel to one set of the filaments, had the following properties:

| | |
|---|---|
| Flexural strength (ASTM D790–61) p.s.i. | 126,400 |
| Wet (after 2-hour boil) p.s.i. | 109,000 |
| Modulus in flexure p.s.i. | 3,300,000 |
| Wet p.s.i. | 3,400,000 |
| Tensile strength (ASTM D638–61T) p.s.i. | 68,000 |
| Modulus in tension p.s.i. | 3,900,000 |
| Compressive strength (ASTM D695–61T) p.s.i. | 80,300 |
| Interlaminar shear strength (Federal test standard No. 406, method 1042A) p.s.i. | 2,760 |

Another test panel was prepared in the same manner except that the fourteen layers of the composite sheet were laid up with all filaments in the same direction. The cured panel which had an organic content of 37.4% by weight, a thickness of 0.135-inch and a specific gravity of 1.81 yielded the following data:

| | |
|---|---|
| Flexural strength p.s.i. | 155,800 |
| Wet p.s.i. | 150,300 |
| Modulus in flexure p.s.i. | $4.6 \times 10^6$ |
| Wet p.s.i. | $4.8 \times 10^6$ |
| Tensile Strength p.s.i. | 119,000 |
| Modulus in tension p.s.i. | $5.9 \times 10^6$ |
| Compressive strength p.s.i. | 99,800 |
| Interlaminar shear strength p.s.i. | 3,420 |

A six-ply crossply panel was prepared in the same manner using the same composite sheet and cured to a thickness of 0.064-inch, an organic content of 30.7% by weight and a specific gravity of 1.87. The following data was obtained under ordinary room temperature conditions:

| | |
|---|---|
| Dielectric constant | 4.27 |
| Dissipation factor | 0.00177 |
| Dielectric strength, volts/mil. | 741 |
| Volume resistivity, megohm-cm. | $1225 \times 10^7$ |

Tapes of the composite sheet of this example of one-inch width were compared for resistance to bird's-eye formation to tapes which were identical except in not having the nonwoven textryl tissue overlay and thus served as controls. A polyethylene film of 4 mils thickness was stretched 2–3% and clamped to a smooth surface. The tapes were laid on the polyethylene film (tissue side up for the composite sheet), and heat and pressure was applied just sufficient to stick the tapes to the film. With a weight over the tapes to keep them flat, the clamps were removed. Examination after one hour revealed extensive bird's-eye formation in the control tapes whereas the tapes of the novel composite sheet were essentially free from bird's-eyes. The shrinkage of the polyethylene film in this test is considered comparable to dimensional changes in low-adhesion liners under adverse conditions. The resistance of the composite sheet to bird's-eye formation in this test is really remarkable.

Each of the test tapes was then cured by itself by placing in an oven between caul plates faced with release paper to apply about 2 p.s.i. pressure at 155° C. for 30 minutes. The cured tapes were tested for tensile strength in a Baldwin tensile tester at a crosshead speed of 0.05-inch per minute. Seven tapes of the composite sheet of this example averaged a resistance to break of 1,130 pounds as compared to 450 pounds for the control tapes. This test indicates the importance of avoiding bird's-eyes for the attainment of cured products of good strength.

*Example 2*

A composite sheet was prepared by applying with heat and pressure an overlay of a nylon tissue to the same lineally-reinforced portion of aligned glass rovings and epoxy resin as was used in making the composite sheet of Example 1, except that the density of the glass filaments was only 145 ends per inch and the resin content of the lineally-reinforced portion was only 25% by weight. The nylon tissue was made from 5.5 denier oriented nylon filaments having a birefringence orientation of about 0.4 which had been given a crimp frequency of about 12 waves per lineal inch. A mass of these fibers chopped to 1¼-inch lengths was randomly interlaced by means of a "Rando-Webber" machine (sold by Curlator Corp., Rochester, N.Y.) into a nonwoven fibrous web which was pressed in the presence of water heated to about 38° C. to lightly fuse the fibers at their crossing points to provide a usefully strong tissue having a basis weight of about 1.0 ounce per square yard and a caliper thickness of about 5 mils. The particular nylon of this tissue was an interpolyamide formed from hexamethylenediammonium adipate, hexamethylene diammonium sebacate and epsilon-caprolactam having a Fisher-Johns melting point of 144° C. and a specific gravity of 1.12. It is soluble in lower alcohols such as methyl alcohol.

The composite sheet of this example provides cured laminates having exceedingly high resistance to interlaminar shear and interlaminar peel. A 20-ply crossply panel cured at about 160° C. and 25 pounds per square inch for 30 minutes with the nylon tissue overlay between adjacent lineally-reinforced layers was tested for resistance to interlaminar failure under Federal test standard No. 406, method 1042B. Since no side supports are used in method 1042B (as opposed to method 1042A followed in Example 1), the test applies a combination of shear and peel forces. Specimens cut from the panel failed at an average of 2,490 pounds per square inch, about double value for an identical panel except for omission of the nylon tissue overlay.

*Example 3*

A composite sheet of a lineally-reinforced layer as in Example 1 and the nylon tissue overlay of Example 2 were used as the top sheet of a seven-ply, crossply stack, the other six sheets consisting of identical sheet material except for the omission of the tissue overlay. A sheet of electrolytic copper foil (treatment A) of 3 mils thickness was placed on top of the stack against the exposed nylon tissue, and the whole was held in a heated platen press at 165° C., first for two minutes at contact pressure and then an additional 28 minutes under 50 p.s.i.

The adhesion of the copper foil was measured by sawing a one-inch wide strip from the cured panel with the lengthwise direction of the strip extending crosswise to the lineal reinforcement of the composite sheet. The end of the copper strip was placed in the jaws of a tensile tester at room temperature and pulled from the panel at a peel angle of 90° at the rate of two inches per minute. The force to so peel the copper foil averaged 27.5 pounds per inch width, an exceedingly high value as evidenced by delamination within the reinforced resinous panel in the test.

The nylon tissue overlay of Example 2 has been found to improve the impact resistance of a cured laminate by a layup in which the nylon tissue was located between every pair of adjacent lineally-reinforced layers. Such improvement is particularly noted where the matrix resin cures to a relatively hard, inflexible state. Such a resin composition (which provides a more supple composite uncured composite sheet than does the above resin composition) consists essentially of equal parts by weight of liquid-type epichloro-hydrin-bisphenol A epoxy resin having an epoxide equivalent weight of about 190 and epoxidized novolak having an epoxide equivalent weight of about 180 ("DEN–438"), and 3% by weight based on total epoxy resin of boron trifluoroidemonoethylamine complex ("BF₃400"). A six-ply crossply panel employing this resin with lineally-aligned glass filaments and nylon tissue between plies showed a two-fold improvement in impact resistance, where the basis weight of the tissue was 0.5-ounce per square yard and its caliper thickness was about 3 mils.

I claim:
1. As a new product of manufacture, a thin flexible self-sustaining composite sheet which can be convolutely wound directly upon itself in a roll and so stored for months while remaining singularly free from bird's-eye formation and later unwound and laid up in stacked segments and converted under heat and pressure to provide high-strength structural members, which sheet as manufactured in form for sale consists essentially of a flat integral layer of uniformly distributed, nonwoven, lineally-aligned, continuous high-strength filaments saturated with and held together by a thermosetting resin binder composition filling the layer, said resin composition having a viscosity of 1 to 35 million poises at room temperature and being capable of remaining within this viscosity range for months under storage conditions, but being fusible and heat-curable to bond firmly to said filaments, said layer having a filament:resin volume ratio between about 65:35 and 35:65 and having a uniform caliper thickness of not more than about 20 mils; and a nonwoven compacted tissue overlay of randomly interlaced smooth organic staple fibers adhered to said resin-impregnated layer but at most only partially impregnated by the resin, said overlay having a basis weight of about 0.2 to one ounce per square yard and a caliper thickness of not more than about 5 mils, the caliper thickness of the overlay in mils in any event being about 2 to 8 times its basis weight in ounces per square yard.

2. As a new product of manufacture, a thin flexible self-sustaining composite sheet which can be convolutely wound directly upon itself in a coherent roll and so stored for months while remaining singularly free from bird's-eye formation and later unwound and laid up in stacked segments and converted under heat and pressure to provide high-strength structural members, which sheet as manufactured in form for sale consists essentially of a flat integral layer of uniformly distributed, nonwoven, lineally-aligned, continuous high-strength filaments saturated with and held together by a thermosetting resin binder composition filling the layer, said resin composition having a viscosity of 1 to 35 million poises at room temperature and being capable of remaining within this viscosity range for months under storage conditions, but being fusible and heat-curable to bond firmly to said filaments, said layer having a filament:resin volume ratio between about 65:35 and 35:65 and having a uniform caliper thickness of less than 15 mils; and a surface overlay of a nonwoven tissue of randomly interlaced smooth organic staple fibers of ¼ to 1½ inches length adhered to said resin-impregnated layer but at most only partially impregnated by the resin, said overlay having a basis weight of 0.2 to 0.5 ounce per square yard and a caliper thickness of 1–3 mils, the caliper thickness of the overlay in mils in any event being about 2 to 8 times its basis weight in ounces per square yard.

3. As a new product of manufacture, a thin flexible self-sustaining composite sheet convolutely wound directly upon itself in a coherent roll and so storable for months while remaining singularly free from bird's-eye formation, which sheet can later be unwound and laid up in stacked segments and converted under heat and pressure to provide high-strength structural members, said sheet as manufactured in form for sale consisting essentially of a flat integral layer of uniformly distributed, nonwoven, lineally-aligned, continuous glass filaments saturated with and held together by a thermosetting resin binder composition filling the layer, said resin composition having a viscosity of 1 to 35 million poises at room temperature and being capable of remaining within this viscosity range for months under storage conditions, but being fusible and heat-curable to bond firmly to said filaments, said layer having a filament:resin volume ratio between about 65:35 and 35:65 and having a uniform caliper thickness of less than 15 mils; and a surface overlay of a textryl tissue of randomly interlaced smooth organic staple fibers of ¼ to 1½ inches length adhered to said resin-impregnated layer but at most only partially impregnated by the resin, said overlay having a basis weight of 0.2 to 0.5 ounce per square yard and a caliper thickness of 1–3 mils, the caliper thickness of the overlay in mils in any event being about 2 to 8 times its basis weight in ounces per square yard.

4. A roll of the composite sheet of claim 1 convolutely wound directly upon itself wherein the resin provides sufficient clinging to hold the sheet together in the roll and yet the sheet can be unwound after months of storage substantially without delamination of the tissue overlay or offsetting of fibers therefrom.

5. The composite sheet of claim 2 wherein said surface overlay is a polyester tissue.

6. The composite sheet of claim 2 wherein said surface overlay is a nylon tissue.

7. The composite sheet of claim 3 wherein said surface overlay is a polyester textryl.

8. The composite sheet of claim 3 wherein said surface overlay is a nylon textryl.

References Cited by the Examiner
UNITED STATES PATENTS

| | | | |
|---|---|---|---|
| 2,626,883 | 1/1953 | Boese | 161—141 X |
| 2,676,128 | 4/1954 | Piccard. | |
| 2,725,309 | 11/1955 | Rodman. | |
| 2,750,030 | 6/1956 | Tierney | 161—144 X |
| 2,847,395 | 12/1958 | Wear | 161—185 |
| 3,030,247 | 4/1962 | Schurb | 161—143 |
| 3,113,061 | 12/1963 | Donaldson | 161—143 X |

ALEXANDER WYMAN, *Primary Examiner.*

M. SUSSMAN, *Examiner.*